July 2, 1963 F. HOMOLA ET AL 3,096,073
OSCILLATION SUPPRESSING ARRANGEMENT FOR TURBINES
Filed Jan. 23, 1961 6 Sheets-Sheet 5

INVENTORS
Friedrich Homola
BY Arnold Witt
Michael S. Striker
Attorney

United States Patent Office 3,096,073
Patented July 2, 1963

3,096,073
OSCILLATION SUPPRESSING ARRANGEMENT FOR TURBINES
Friedrich Homola and Arnold Witt, Oberursel, Taunus, Germany, assignors to Klockner-Humboldt-Deutz, Cologne, Germany
Filed Jan. 23, 1961, Ser. No. 84,345
18 Claims. (Cl. 253—39)

The present invention relates to an oscillation suppressing arrangement for turbines which is advantageously applied to radial flow turbines and axial flow turbines.

The present invention is concerned with turbines of the type in which the fluid is admitted into the passages of the rotor along an admission zone. When the rotor vanes enter the admission zone, the dynamic force of the gaseous fluid acts fully on a rotor vane entering the admission zone, while no force at all acts on the rotor vanes directly before entering the admission zone, and directly after leaving the admission zero. The sudden impact of the fluid, as well as the sudden termination of such impact on the rotor vanes, will cause oscillations in the rotor vanes which may result in breaking of the vanes if oscillations at the resonance frequency occur.

It is the object of the present invention to overcome this disadvantage of known turbines, and to provide an oscillation suppressing arrangement by which resonance oscillations, and harmonic oscillations are completely, or at least partly, suppressed.

Another object of the present invention is to reduce the dynamic force acting on the rotor vane when the same enters or leaves the admission zone.

A further object of the present invention is to reduce at the ends of the admission zone for the fluid, the cross section of the admission zone so that a smaller amount of fluid impinges the rotor vanes at the ends of the admission zone that at the center thereof.

With these objects in view, the present invention relates to a turbine which has guide passage means in the housing thereof for guiding a fluid into rotor passages formed between the rotor vanes. The guide passage means define an admission zone through which fluid is admitted to the rotor passages, and which is passed by successive rotor passages during rotation of the rotor vane means.

In accordance with the present invention, the guide passage means are constructed and arranged so that fluid flows into each rotor passage entering and leaving the admission zone through a smaller cross section than when the respective rotor passage is located in said admission zone. In this manner, oscillations of the rotor vanes are at least partly suppressed. The reduced cross section and its shape and area is selected so that a Fourier analysis of the oscillation excitation of the rotor vanes is free of at least one specific harmonic oscillation which occurs when fluid is admitted through the entire cross section of a rotor passage and which may excite the rotor vanes to resonance oscillations. Several harmonic oscillations occurring when fluid is admitted through the entire cross section of a rotor passage, and which may cause rotor vane oscillations within a certain range of rotor speeds may be at least partly suppressed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
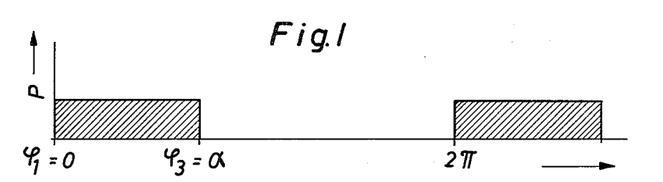
FIG. 1 is a diagram illustrating the dynamic force of a gaseous fluid acting on the rotor vanes of a turbine of the above described type during a revolution.

Referring now to the drawings, and more particularly in FIG. 1, in known turbines, the force of the gaseous fluid P is shown as a function of the angle through which the turbine rotor turns. The force rises from zero to a certain value at which it remains until it again drops to zero at the end of the admission zone, and remains at zero value until the rotor has turned through 360°, whereupon the same cycle is repeated.

Figure 2:
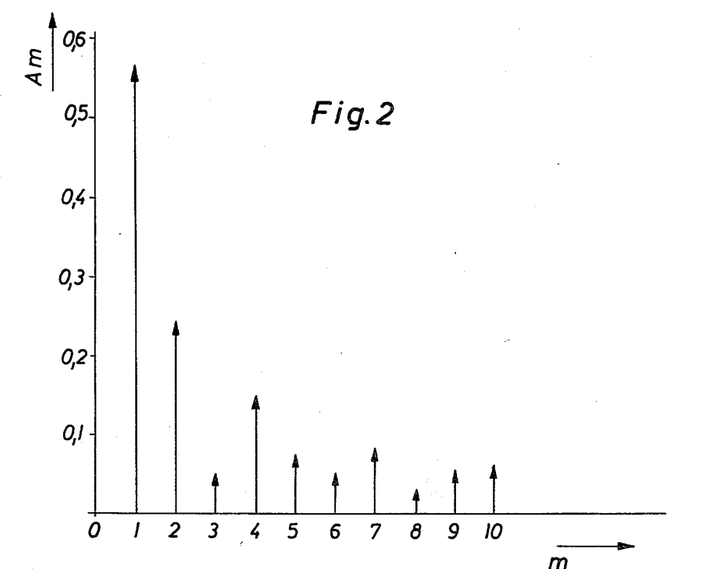
FIG. 2 is a diagram illustrating excitation forces according to a Fourier analysis of a series of harmonic oscillations.
Figure 3:
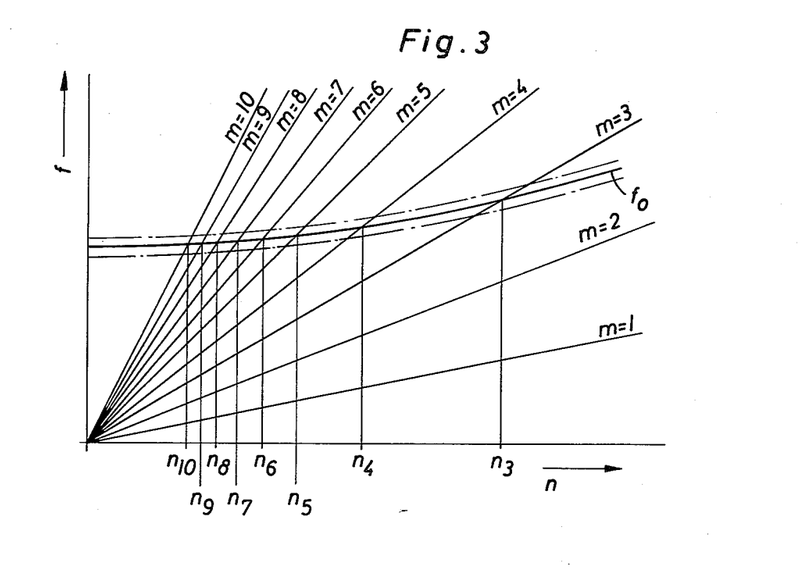
FIG. 3 is a diagram illustrating the frequencies of harmonic oscillations depending on the rotary speed of the rotor vanes.

Since any non-harmonic periodic function can be divided into a plurality of sinusoid oscillations of the $m$th according to Fourier wherein $m$ is an integer and represents the order of the excitation force, resonance occurs at a number of revolutions $n_r$ in accordance with the following equation:

$$n_r = \frac{f_0 \cdot 60}{m} \text{ rev. per min.}$$

wherein $n_r$ is the resonance frequency, and $f_0$ is the natural frequency in cycles per second. A Fourier analysis will result in a resonance spectrum as shown in FIG. 2 where the ordinates represent the periodic excitation force $A_m$ which is equal to the exciting force divided by the dynamic gas force P. The integers along the abscissa represent the orders $m$ of the excitation. The resonance diagram of FIG. 3 shows the function of the natural frequency $f_0$ over the rotary speed of the rotor represented by revolutions per minute $n$. Since the lines representing the harmonic frequencies for different values of $m$ intersect the graph $f_0$, it is evident that, if the turbine is to be operated within a fairly great range of rotary speeds, it is not possible to avoid rotary speeds at which resonance oscillations will occur in the rotor vanes. The danger of damage to the rotor vanes due to resonance frequency oscillations is particularly great in the upper range of rotary speed, since not only the static stress of the vanes due to the action of the centrifugal force, but also the oscillation stress increases since the dynamic gas force becomes greater as the rotary speed is increased.

It has been proposed to reduce the dangerous oscillations of the rotor vanes by wires passing in circumferential direction through several rotor vanes so that due to the friction caused by the centrifugal force between the wires and the surfaces of the bores in the vanes, the amplitude of the oscillations of the vanes is reduced. However, such wires pass through the passages in which the gaseous fluid flows, and consequently cause undesirable losses due to the occurrence of turbulence.

Figure 4:
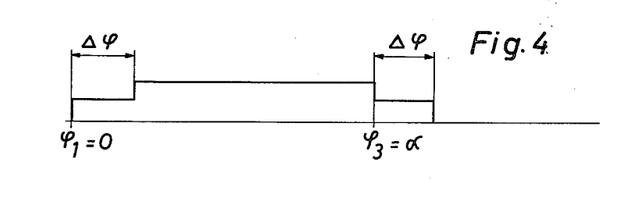
FIG. 4 is a diagram corresponding to a part of the diagram of FIG. 1 and illustrating a step-wise reduction of dynamic force at the ends of the admission zone.
Figure 5:
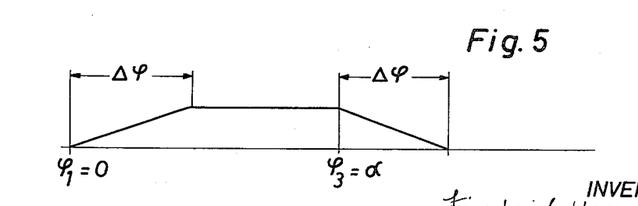
FIG. 5 is a digram corresponding to a part of the diagram of FIG. 1 and illustrating a gradual reduction of the dynamic force at the ends of the admission zone.

In accordance with the present invention, undesired stress in the rotor vanes caused by oscillations is eliminated by designing and shaping the cross section of the passage in the housing through which the fluid is guided into the rotor in such a manner that the fluid flows into each rotor passage passing the admission zone only through a part of the cross section of the rotor passage, when the same enters or leaves the admission zone. Admission control means are provided for this purpose and are located in the proximity of the rotor passages, and preferably directly adjacent the inlet portions of the rotor passages. The admission control means effect a step-wise reduction of the force P along an angle $\Delta\phi$ not only in the first part of the admission zone but also in the last part of the admission zone, as indicated in the diagram of FIG. 4. In accordance with another modification of the present invention, the cross section of the admission zone is gradually increased along an angle $\Delta\phi$, and again gradually reduced along an angle $\Delta\phi$ as shown in FIG. 5.

In a turbine which is not provided with the improvement of the present invention, the admission zone extends between the angle $\phi_1=0$ and an angle $\phi_3=\alpha$, and the force of the gaseous fluid would rise at the angle $\phi_1$ from zero to a maximum, and would drop at the angle $\alpha$ from the maximum to zero. In the arrangement of the present invention as shown in FIG. 4, the gas force will first have a lower value and then be increased to maximum value, and at the end of the admission zone, the gas force will first be reduced to an intermediate value, and then drop to zero. In the embodiment of the invention illustrated in FIG. 5, the gas force will gradually increase to maximum value and then again gradually drop to zero. A Fourier analysis of the excitation forces occuring in the arrangement of the present invention proves that detrimental harmonics causing resonance oscillations in the rotor vanes as explained with reference to FIGS. 1 to 3, are either completely eliminated or at least partly suppressed.

Figure 6:
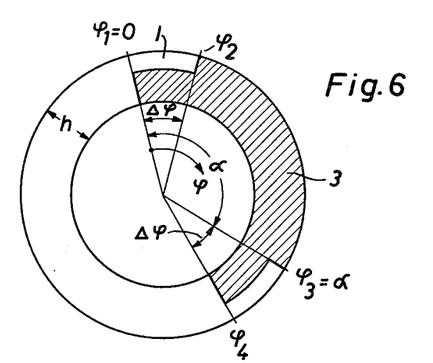
FIG. 6 is a schematic cross-sectional view through an axial flow turbine in accordance with one embodiment of the present invention in which the height of the admission zone is step-wise reduced at the ends of the admission zone.
Figure 7:
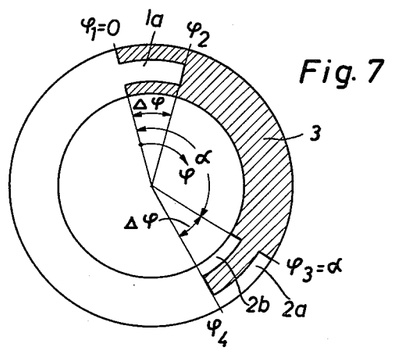
FIG. 7 is a cross-sectional view corresponding to FIG. 6 but illustrating a modified embodiment of the present invention.
Figure 8:
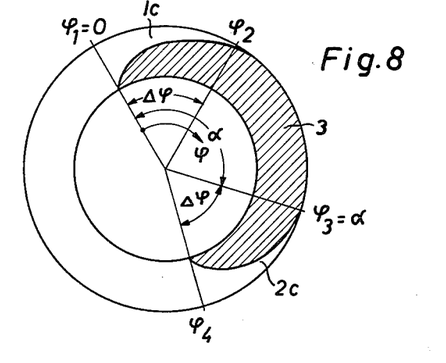
FIG. 8 is a cross-sectional view corresponding to FIG. 6 but illustrating another embodiment of the present invention in which the cross section of the admission zone is gradually reduced at the ends of the admission zone.

FIGS. 6, 7 and 8 illustrate the construction of the admission control means of the present invention as applied to an axial flow turbine. In the embodiment of FIG. 6, the admission control means 1 and 2 are respectively located at the ends of the admission zone 3 so that only the hatched area is open for the flow of the fluid from the guide passage in the housing into the passages formed by the rotor vanes. The admission control means are strip-shaped and are bounded by concentric circles and a radial line. The arc of the admission control means extends through the angle $\Delta\phi$ through a fraction of the angle $\phi_4$, which is almost 180° in the embodiment of FIG. 6. The angle $\Delta\phi$, $\phi_2$ is about 30°. The full excitation force acts between the angles $\phi_2$ and $\phi_3$. In a conventional turbine, the admission zone would extend through the angle $\alpha$. In the embodiment of FIG. 6, the height $h$ of the admission zone is reduced by the admission control means 1 and 2 along the angles $\Delta\phi$.

The embodiment of FIG. 7 is similar to the embodiment of FIG. 6, and also obtains a step-wise reduction of the excitation force at the ends of the arcuate admission zone. However, the strip-shaped admission control means 1a is located within the admission zone 3a, while at the other end of the admission zone, two strip-shaped admission control means 2a and 2b are provided which extend along the circular outer boundary lines of the admission zone.

In the embodiment of FIG. 8, the gas force is gradually increased and reduced at the ends of the admission zone which is achieved by tapering admission control means 1c and 2c which are bounded by arcuate lines and extend through angles $\Delta\varphi$, respectively, which are about 60°. In a conventional arrangement, the admission zone would extend between the angles $\varphi_1$ and $\varphi_3$, be equal to $\alpha$ and be bounded by two circles, and two radial lines.

Figure 9:
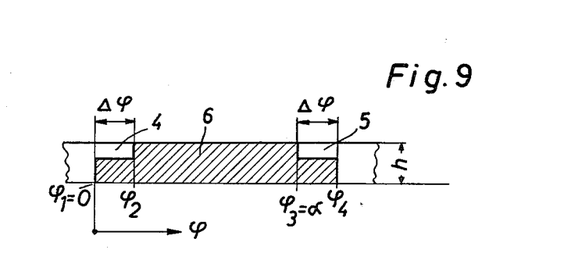
FIG. 9 is a fragmentary schematic developed view of the admission zone of a radial flow turbine according to the present invention in which the cross section of the admission zone is step-wise reduced at the ends of the admission zone.
Figure 10:
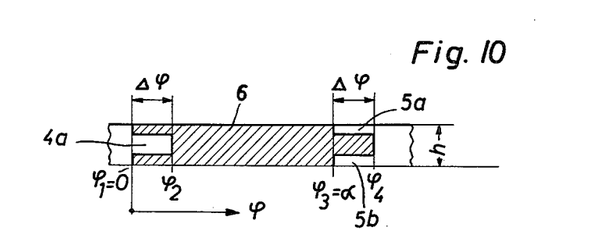
FIG. 10 is a developed view corresponding to FIG. 9 but illustrating a modified construction for step-wise reducing a cross section of the admisison zone at the ends of the same.
Figure 11:
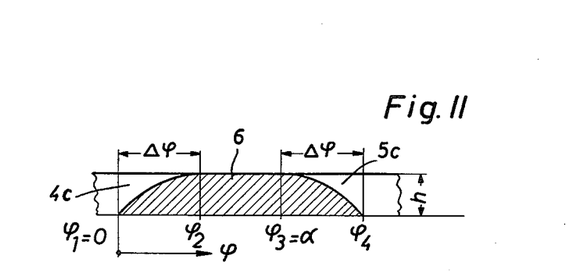
FIG. 11 is a fragmentary developed view of the admission zone of a radial flow turbine according to the present invention in which the cross section of the admission zone is gradually and continuously reduced at the ends of the admission zone.

FIGS. 9 to 11 illustrate in developed views the admission zones of radial flow turbines. In the embodiment of FIG. 9, admission control means 4 and 5 are provided at the ends of the arcuate admission zone defined by a stator passage so that the admission zone 6 has the shape and cross section indicated by the hatched area. The excitation force will be smaller at the ends of the admission zone than at the center of the admission zone since the height of the cross section through which fluid flows into each rotor passage is reduced at the ends of the admission zone.

FIG. 10 shows an embodiment similar to the embodiment of FIG. 9, the difference being that the strip-shaped admission control means 4a is located in the center of the admission zone at one end of the same, whereas two admission control means 5a and 5b are provided at the other end of the admission zone spaced from each other in axial direction of the turbine.

FIG. 11 illustrates another embodiment of a radial flow turbine according to the present invention in which the admission control means 4c and 5c taper from the ends of the admission zone towards the center of the same and are bounded by arcuate lines, one of which extends along a circle, and the other of which extends along a three-dimensional curve. This arrangement results in a gradual increase and decrease of the excitation force at the beginning and end of the admission zone 6.

Figures 12, 13, 14:
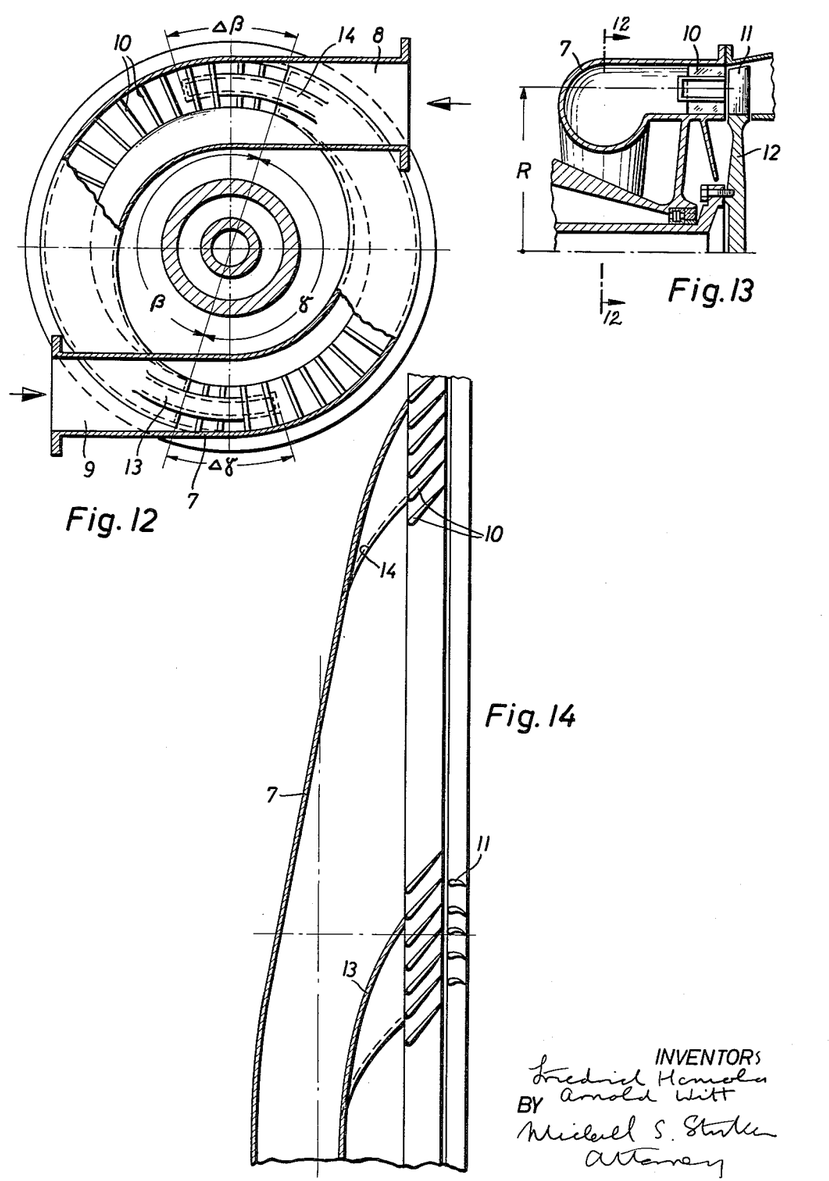
FIG. 12 is an elevation, partly in section along line 12—12 in FIG. 13, of an axial flow turbine according to the present invention.
FIG. 13 is a fragmentary axial sectional view of the turbine illustrated in FIG. 12.
FIG. 14 is a fragmentary developed view showing a part of the turbine of FIGS. 12 and 13 on an enlarged scale and in section along a circle having the radius R.

Referring now to FIGS. 12 to 14 which illustrate a practical embodiment of an axial flow turbine according to the present invention, the spiral casing 7 includes two inlet means 8 and 9 through which the fluid flows into a pair of guide passage means having part-circular outlets extending substantially through the angles $\beta$ and $\gamma$ and being provided with stationary guide vanes 10 through which the fluid flows into the rotor passages defined by the rotor vanes 11.

In accordance with the invention, the two admission zones formed by the outlets of the two guide passages overlap since the guide passages respectively include admission control passage portions 13 and 14. The first guide passage means which extends through the angle $\beta$ has a control passage portion 13 extending through the angle $\Delta\gamma$ into the admission zone defined by the other guide passage along the angle $\gamma$. The other guide passage means has a control passage portion 14 extending through the angle $\Delta\beta$ into the admission zone which extends along the angle $\beta$. The radial extension of the admission control passage portions 13 and 14 is smaller than the radial length of the guide vanes 10 and then the radial extension of the main portions of the guide passage means so that the rotor vanes 11 are not subjected to the full impact of the fluid, and are not completely relieved of the impact of the fluid when passing into and out of the two admission zones.

Figure 15:
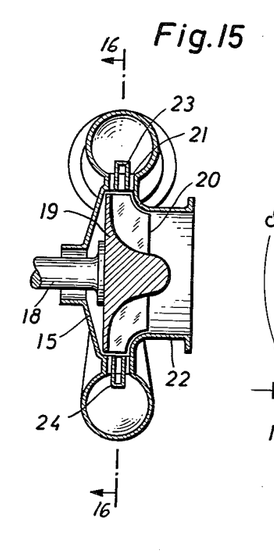
FIG. 15 is an axial sectional view of a radial flow turbine according to the present invention.
Figure 16:
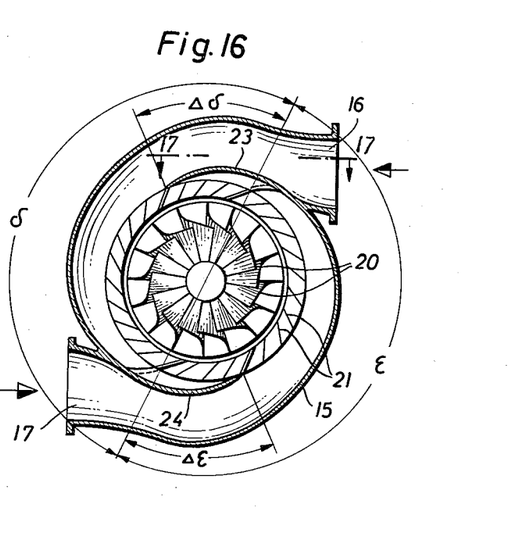
FIG. 16 is a cross-sectional view taken on line 16—16 in FIG. 15.
Figure 17:
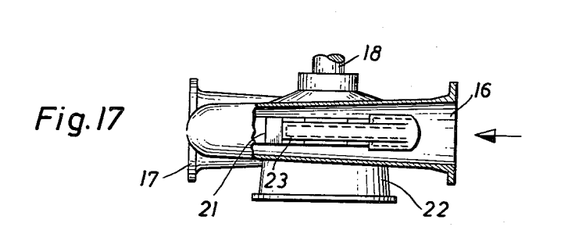
FIG. 17 is a plan view, partly in section on line 17—17 in FIG. 16, illustrating the turbine of FIGS. 15 and 16.

Referring now to FIGS. 15, 16 and 17 which show a radial flow turbine according to the present invention, the spiral housing 15 has two inlet means 16 and 17, which lead into two guide passages through which the fluid is supplied along part-circular admission zones to the rotor vanes 20 of a rotor 19 which is mounted on a shaft 18 and has an axial outlet means 22.

The two admission zones extend respectively through the angles δ, ε shown to be 180°, and each guide passage means has an admission control passage portion 23 and 24, respectively which extends through an angle Δδ, Δε into the respective other admission control zones.

It will be understood that each of the elements described above, or two or more together, may also find a useful application in other types of turbines differing from the types described above.

While the invention has been illustrated and described as embodied in an arrangement for suppressing oscillations of the rotor vanes in turbines in which admission of fluid into the rotor passages takes place over an angle of less than 360°, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a turbine, in combination, rotor vane means forming rotor passages and moving along a path; and guide passage means for guiding a fluid into said rotor passages and defining a fluid admission zone extending along said path so that said admission zone is passed by successive rotor passages during rotation of said rotor vane means, said guide passage means being constructed and arranged so that fluid flows into each rotor passage at least at one end of said admission zone through a smaller cross section than when the respective rotor passage is located in the adjacent part of said admission zone, said smaller cross section having such a ratio to the cross section at the center of said admission zone that a Fourier analysis of the oscillation excitation of said rotor vane means by the dynamic gas force based on the resonance oscillation frequency of said rotor vane means is at least partly free of at least one harmonic oscillation occurring when fluid is admitted through the entire cross section of a rotor passage whereby oscillations of said rotor vane means are at least partly suppressed.

2. In a turbine, in combination, rotor vane means forming rotor passages and moving along a path; and guide passage means for guiding a fluid into said rotor passages and defining a fluid admission zone extending along said path so that said admission zone is passed by successive rotor passages during rotation of said rotor vane means, said guide passage means including admission control means extending along said path and providing a reduced transverse extension for said admission zone at the ends thereof so that fluid flows into each rotor passage at each end of said admission zone through a smaller cross section than when the respective rotor passage is located in the central part of said admission zone, said smaller cross sections having such a ratio to the cross section at the center of said admission zone that a Fourier analysis of the oscillation excitation of said rotor vane means by the dynamic gas force based on the resonance oscillation frequency of said rotor vane means is at least partly free of at least one harmonic oscillation occurring when fluid is admitted through the entire cross section of a rotor passage whereby oscillations of said rotor vane means are at least partly suppressed.

3. In a turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including admission control means located at the ends of said arcuate admission zone and extending at either end through an angle which is a selected fraction of said arc and providing a reduced height for said arcuate admission zone at the ends thereof so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

4. In a turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including stepped admission control means located at the ends of said arcuate admission zone and extending at either end through an angle which is a selected fraction of said arc and providing a stepwise reduced height for said arcuate admission zone at the ends thereof so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

5. In a turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including gradually tapering admission control means located at the ends of said arcuate admission zone and extending at either end through an angle which is a selected fraction of said arc and providing a gradually and continuously reduced height for said arcuate admission zone at the ends thereof so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

6. In an axial turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including admission control means located at the ends of said arcuate admission zone and extending at either end through an angle which is a selected fraction of said arc and providing a stepwise reduced height for said arcuate admission zone at the ends thereof, said admission control means having the shape of an arcuate strip bounded by parts of concentric circles and by radii of said circles so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

7. In an axial turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including admission control means located at the ends of said arcuate admission zone and extending at either end through an angle which is a selected fraction of said arc and providing a continuously and gradually reduced height for said arcuate admission zone at the ends thereof, said admission control means gradually tapering away from the ends and toward the center of said admission zone and being bounded by two arcuate lines so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

8. In a radial turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including admission control means located at the ends of said arcuate admission zone and extending at either end through an angle which is a selected fraction of said arc and providing a stepwise reduced height for said arcuate admission zone at the ends thereof, said admission control means having the shape of an arcuate strip bounded by parts of parallel circles located in parallel planes, and by parallel lines extending perpendicular to said planes and in axial direction of the turbine so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

9. In a radial turbine, in combination, rotor vane means forming rotor passages; and guide passage means for guiding a fluid into said rotor passages and defining an arcuate fluid admission zone passed by successive rotor passages during rotation of said rotor vane means and extending along an arc, said guide passage means including admission control means located at the ends of said arcuate admission zone and extending at either end through an angle which is a selected fraction of said arc and providing a continuously and gradually reduced height for said arcuate admission zone at the ends thereof, said admission control means gradually tapering away from the ends and toward the center of said admission zone and being bounded by two arcuate lines so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

10. In a turbine, in combination, rotor vane means forming rotor passages; and guide passage means for guiding a fluid into said rotor passages and defining an arcuate fluid admission zone passed by successive rotor passages during rotation of said rotor vane means and extending along an arc through a selected angle, said guide passage means including admission control means disposed in the proximity of said rotor vane means and rotor passages and providing a reduced height for said arcuate admission zone at the ends thereof over a selected angle so that fluid flows into each rotor passage entering and leaving said admission zone through a smaller cross section than when the respective rotor passage is located in the central part of said admission zone, said angle being selected in accordance with the resonance oscillation frequency of said rotor vane means so that a Fourier analysis of the oscillation excitation of said rotor vane means by the dynamic gas force based on said resonance oscillation frequency is free of a harmonic oscillation occurring when fluid is admitted through the entire cross section of a rotor passage or so that several harmonic oscillations occurring when fluid is admitted through the entire cross section of a rotor passage are at least partly suppressed.

11. A turbine as set forth is claim 10 wherein said admission control means have a stepped shape for stepwise altering the cross section of said admission zone.

12. A turbine as set forth in claim 10 wherein said admission control means have a tapering shape for gradually and continuously altering the cross section of said admission zone.

13. In an axial turbine, in combination, rotor vane means forming rotor passages; and guide passage means for guiding a fluid into said rotor passages and defining an arcuate fluid admission zone passed by successive rotor passage during rotation of said rotor vane means and extending along an arc, said guide passage means including admission control means located at the ends of said arcuate admission zone and extending at either end through an angle which is a selected fraction of said arc and providing a stepwise reduced height for said arcuate admission zone at the ends thereof, one of said admission control means having the shape of an arcuate strip bounded by parts of concentric circles and by radii of said circles and the other admission control means comprising two arcuate strips bounded by concentric circles and by radii of said circles so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

14. In a radial turbine, in combination, rotor vane means forming rotor passages; and guide passage means for guiding a fluid into said rotor passages and defining an arcuate fluid admission zone passed by successive rotor passages during rotation of said rotor vane means and extending along an arc through a selected angle, said guide passage means including admission control means located at the ends of said arcuate admission zone and extending at either end through an angle which is a selected fraction of said arc and providing a stepwise reduced height for said arcuate admission zone at the ends thereof, one of said admission control means having the shape of an arcuate strip bounded by parts of parallel circles located in parallel planes, and by parallel lines extending perpendicular to said planes and in axial direction of the turbine and the other admission control means comprising two arcuate strips bounded by circles located in parallel planes and by parallel lines perpendicular to said planes so that fluid flows into each rotor passage entering and leaving said admission zone through a smaller cross section than when the respective rotor passage is located in the central part of said admission zone, said fraction being selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

15. In a turbine, in combination, a rotor having rotor vane means forming rotor passages, said rotor passages moving along a circular path during rotation of said rotor; and guide passage means for guiding a fluid into said rotor passages and defining at least one fluid admission zone extending along said path so that said admission zone is passed by successive rotor passages during rotation of said rotor, said guide passage means including admission control passage portions located at the ends of said admission zone and having in a direction transverse to said path a smaller transverse extension than the central portion of said guide passage means for reducing the transverse extension of said admission zone at said ends thereof so that fluid flows into each rotor passage at said ends of said admission zone through a smaller cross section than when the respective rotor passage is located in the central part of said admission zone, said admission control passage extending through an angle selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

16. In a turbine, in combination, a rotor having rotor vane means forming rotor passages, said rotor passages moving along a circular path during rotation of said rotor; and a pair of guide passage means for guiding a fluid into said rotor passages and defining a pair of fluid admission zones extending along said path so that said admission zones are passed by successive rotor passages during rotation of said rotor, each of said guide passage means including admission control passage portions located at the ends of said admission zone of the respective other guide passage means and having in a direction transverse to said path a smaller transverse extension than the central portion of said guide passage means for reducing the transverse extension of said admission zone at said ends thereof so that fluid flows from each guide passage means into each rotor passage at said ends of each admission zone through a smaller cross section than when the respective rotor passage is located in the central part of each admission zone, said admission control passage extending through an angle selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

17. In an axial flow turbine, in combination, a rotor having rotor vane means forming rotor passages, said rotor passages moving along a circular path during rotation of said rotor; a pair of guide passage means for guiding a fluid into said rotor passages and defining a pair of fluid admission zones extending along said path so that said admission zones are passed by successive rotor passages during rotation of said rotor, each of said guide passage means including admission control passage portions located at the ends of said admission zone of the respective other guide passage means, each said control passage portion having in a direction transverse to said path a smaller transverse extension than the central portion of said guide passage means, each control passage portion having an outlet bounded by parts of concentric circles spaced a radial distance smaller than the radial extension of said admission zone so that fluid flows from each guide passage means into each rotor passage at said ends of each admission zone through a smaller cross section than when the respective rotor passage is located in the central part of each admission zone, each admission control passage extending through an angle selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

18. In a radial flow turbine, in combination, a rotor having rotor vane means forming rotor passages, said rotor passages moving along a circular path during rotation of said rotor; and a pair of guide passage means for guiding a fluid into said rotor passages and defining a pair of fluid admission zones extending along said path so that said admission zones are passed by successive rotor passages during rotation of said rotor, each of said guide passage means including admission control passage portions located at the ends of said admission zone of the respective other guide passage means, each said control passage portion having in a direction transverse to said path a smaller transverse extension than the central portion of said guide passage means, said control passage portion having an outlet bounded by parts of parallel circles spaced an axial distance smaller than the axial extension of said admission zone so that fluid flows from each guide passage means into each rotor passage at said ends of each admission zone through a smaller cross section than when the respective rotor passage is located in the central part of each admission zone, each admission control passage extending through an angle selected in accordance with the resonance oscillation frequency of said rotor vane means so that a Fourier analysis of the oscillation excitation of said rotor vane means by the dynamic gas force based on said resonance oscillation frequency is at least partly free of at least one harmonic oscillation occurring when fluid is admitted through the entire cross section of a rotor passage.

References Cited in the file of this patent

UNITED STATES PATENTS

| | | |
|---|---|---|
| 2,392,463 | Cook et al. | Jan. 8, 1946 |

FOREIGN PATENTS

| | | |
|---|---|---|
| 13,893 | Great Britain | July 5, 1905 |
| 561,647 | Great Britain | May 30, 1944 |